J. M. FELLOWS.
TIRE BOLT.
APPLICATION FILED APR. 16, 1908.
916,133.
Patented Mar. 23, 1909.
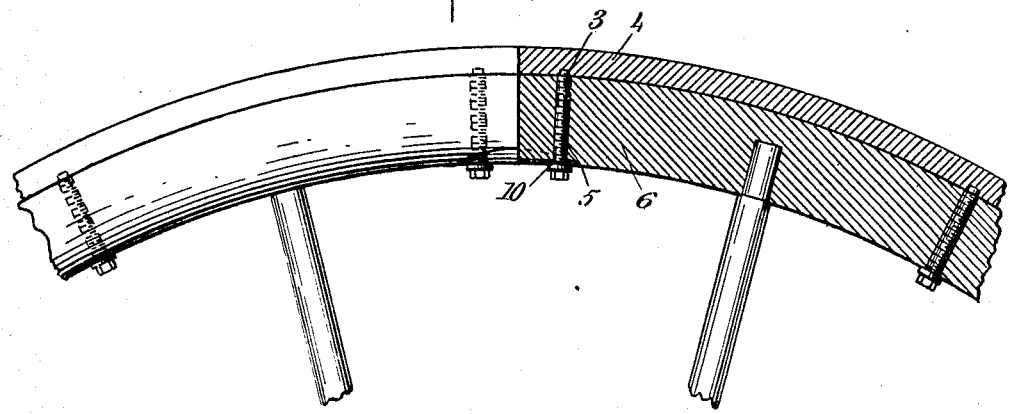
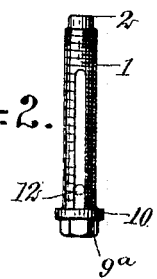
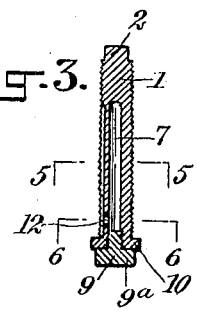
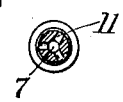
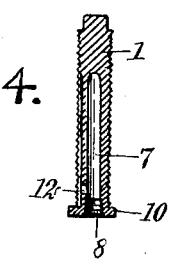
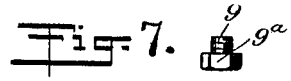
WITNESSES
Frederick G. Hackenburg.
INVENTOR
John M. Fellows
BY Munn & Co
ATTORNEYS
THE NORRIS PETERS CO., WASHINGTON, D. C.

UNITED STATES PATENT OFFICE.

JOHN M. FELLOWS, OF BURLINGTON, INDIANA.

TIRE-BOLT.

No. 916,133.      Specification of Letters Patent.      Patented March 23, 1909.

Application filed April 16, 1908. Serial No. 427,296.

*To all whom it may concern:*

Be it known that I, JOHN M. FELLOWS, a citizen of the United States, and a resident of Burlington, in the county of Carroll and State of Indiana, have invented a new and Improved Tire-Bolt, of which the following is a full, clear, and exact description.

This invention relates to tire bolts, and more particularly such bolts as are used to secure tires on wheels, and which are adapted to contain substances which when the wood is impregnated therewith, tend to lengthen the life thereof.

An object of this invention is to provide a bolt simple and inexpensive to manufacture, and which has a recess therein to contain substances such as oil, grease or the like, and which is formed to permit these substances to come in contact with the wood of the felly.

A further object of the invention is to provide a bolt for securing a metal tire on a felly, the end of the bolt engaging a recess in the tire and thus obviating the necessity of providing an opening through the tire and a bolt head countersunk therein.

This invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is an elevation of a portion of a wheel partly in section, showing my invention applied thereto; Fig. 2 is an enlarged elevation of the device; Fig. 3 is a longitudinal section of the bolt; Fig. 4 is a longitudinal section showing a part removed; Fig. 5 is a cross section on the line 5—5 of Fig. 3; Fig. 6 is a cross section on the line 6—6 of Fig. 3; and Fig. 7 is an elevation of a detail of my invention.

Before proceeding to a more detailed description of my invention, it should be understood that I provide bolts for securing metal tires on the fellies of wheels, which obviate the necessity of holes being bored through the tires and thus weakening them. The bolts have their ends received by recesses at the inner sides of the tires. Further, these bolts are partially hollow in form and have a removable nut which permits the hollow part to be filled with suitable materials, such as oil, grease or the like. Grooves having communication with the hollow bolts, serve to distribute the material and allow it to come in contact with the wood of the felly, to preserve it and to lengthen the period of its usefulness.

Referring more particularly to the drawings, I provide a suitably threaded bolt body 1, adapted to be arranged in a correspondingly threaded opening 5 of the felly 6, and having one end thereof preferably constricted to form a stud 2, so that it may be arranged in a recess 3 of a tire 4. At the end remote from the stud 2, the body has an annular laterally extending flange 10. The bolt has a well 7 formed by an elongated bore and having an opening 8 at the flange end of the body, the opening being threaded to receive a similarly threaded nut 9. The bolt body has a plurality of longitudinal grooves 11, at which are located openings 12 connecting the well 7 with the grooves, and permitting the escape of the contents of the well to the grooves. The nut 9 has a head 9ᵃ of angular section, so that it can be operatively engaged by a wrench or other suitable implement. The flange 10 may be of any suitable angular form to render the insertion and removal of the bolt body less difficult when a wrench or similar tool is used. The flange further engages at the inner side of the felly to limit the insertion of the bolt body in the opening therefor.

Having thus described my invention, I claim as new and desire to secure by Letters Patent:

1. A bolt adapted to be arranged in an opening of a felly and having a well formed to contain a preservative substance, the bolt having means for distributing the substance, and having an end formed to engage a recess in the tire to hold the same in place.

2. In a device of the class described, a threaded bolt body having a well, said body having grooves on the outside thereof and openings connecting said grooves with said well, said grooves serving to distribute the contents of the well, and a removable nut for closing said well.

3. In a device of the class described, a threaded bolt body having one end constricted to form a stud for engaging a recess at the inner side of a tire, said bolt having a well, said body further having grooves on the outside thereof, and openings connecting said grooves with said well, said grooves serving to distribute the contents of said well, a flange at the end remote from said stud, for engaging at the inner side of a felly to limit the insertion of said bolt body therein, and a removable nut for closing said well.

In testimony whereof I have signed my name to this specification in the presence of two subscribing witnesses.

JOHN M. FELLOWS.

Witnesses:
OSCAR WELTY,
CLAUDE VINEY.